US008450453B2

(12) United States Patent
Hamunen

(10) Patent No.: US 8,450,453 B2
(45) Date of Patent: May 28, 2013

(54) PROCESS FOR ISOLATION OF FATTY ACIDS, RESIN ACIDS AND STEROLS FROM TALL OIL PITCH

(75) Inventor: Antti Hamunen, Turku (FI)

(73) Assignee: Ravintoraisio OY, Raisio (FI)

( * ) Notice: Subject to any disclaimer, the term of this patent is extended or adjusted under 35 U.S.C. 154(b) by 435 days.

(21) Appl. No.: 12/524,675

(22) PCT Filed: Feb. 15, 2008

(86) PCT No.: PCT/FI2008/000027
§ 371 (c)(1),
(2), (4) Date: Feb. 2, 2010

(87) PCT Pub. No.: WO2008/099051
PCT Pub. Date: Aug. 21, 2008

(65) Prior Publication Data
US 2010/0137556 A1    Jun. 3, 2010

(30) Foreign Application Priority Data

Feb. 15, 2007 (FI) ...................................... 20070137

(51) Int. Cl.
*C11B 13/00* (2006.01)
*C07J 9/00* (2006.01)
(52) U.S. Cl.
USPC ............................ 530/208; 530/205; 552/545
(58) Field of Classification Search
USPC ................................. 552/545; 530/205, 208
See application file for complete search history.

(56) References Cited

U.S. PATENT DOCUMENTS

| | | | |
|---|---|---|---|
| 3,691,211 A * | 9/1972 | Julian | 552/545 |
| 3,887,537 A | 6/1975 | Harada et al. | |
| 3,926,936 A | 12/1975 | Lehtinen | |
| 4,076,700 A * | 2/1978 | Harada et al. | 530/206 |
| 4,256,628 A * | 3/1981 | Tate | 530/205 |
| 4,524,024 A * | 6/1985 | Hughes | 530/205 |
| 4,568,496 A * | 2/1986 | Kulkarni et al. | 554/207 |
| 5,097,012 A * | 3/1992 | Thies et al. | 530/206 |
| 6,057,462 A * | 5/2000 | Robinson et al. | 552/545 |
| 6,107,456 A * | 8/2000 | Huibers et al. | 530/205 |
| 6,414,111 B2 * | 7/2002 | Huibers et al. | 530/205 |
| 6,465,665 B1 * | 10/2002 | Schersl | 552/545 |
| 6,846,941 B2 * | 1/2005 | Rohr et al. | 554/195 |
| 7,202,372 B2 * | 4/2007 | Hamunen | 552/540 |
| 7,244,856 B2 * | 7/2007 | Sicre et al. | 552/545 |
| 2002/0107168 A1 * | 8/2002 | Hamunen | 510/458 |
| 2003/0109729 A1 * | 6/2003 | Diaz et al. | 552/540 |
| 2003/0144536 A1 * | 7/2003 | Sonnier et al. | 552/545 |
| 2004/0024175 A1 * | 2/2004 | Wong et al. | 530/230 |
| 2005/0010061 A1 * | 1/2005 | Hamunen | 552/540 |
| 2005/0033027 A1 | 2/2005 | Rohr et al. | |
| 2005/0107582 A1 * | 5/2005 | Wong et al. | 530/205 |
| 2005/0203279 A1 * | 9/2005 | Rojas et al. | 530/205 |
| 2006/0128949 A1 * | 6/2006 | Wong et al. | 530/500 |
| 2006/0166951 A1 * | 7/2006 | Sanbom | 514/169 |
| 2006/0235198 A1 * | 10/2006 | Sato et al. | 530/230 |
| 2007/0173639 A1 * | 7/2007 | Wong et al. | 530/500 |
| 2008/0262251 A1 * | 10/2008 | Sato et al. | 552/545 |
| 2009/0113786 A1 * | 5/2009 | Lindstrom et al. | 44/308 |

FOREIGN PATENT DOCUMENTS

| | | |
|---|---|---|
| CZ | 256092 | 7/1987 |
| EP | 0 952 208 A2 | 10/1999 |
| EP | 1 081 156 A2 | 3/2001 |
| WO | WO 99/16785 A1 | 4/1999 |
| WO | WO 99/42471 A1 | 8/1999 |
| WO | WO 00/64924 A1 | 11/2000 |
| WO | WO 03/064442 A2 | 8/2003 |

* cited by examiner

Primary Examiner — Liam Heincer
(74) Attorney, Agent, or Firm — Arent Fox LLP

(57) ABSTRACT

The invention relates to a process for recovering fatty acids, resin acids and sterols from tall oil pitch, said process comprising a) saponifying the tall oil pitch with an alkali to hydrolyse esters included in the pitch to free alcohols and organic acids in salt form, b) acidulating the saponified pitch with a mineral acid to convert the organic acids in salt form into free organic acids and to form an organic phase and an aqueous phase, c) separating the aqueous phase from the organic phase, d) evaporation fractionating the organic phase to obtain a distillate rich in sterols, fatty acids and resin acids, e) evaporation fractionating the distillate to obtain a bottom fraction rich in sterols, and a distillate rich in fatty acids and resin acids, and f) subjecting the sterols in the sterol-rich bottom fraction to crystallization purification. The invention also relates to an alternative process including steps a) to c) followed by d1) treating the organic phase with an alkali to destroy excess mineral acid used for acidulating the saponified pitch, e1) evaporation fractionating the alkali-treated organic phase to obtain a distillate rich in fatty acids and resin acids and a bottom fraction rich in sterols, f1) evaporation fractionating the bottom fraction to obtain a distillate rich in sterols, and g1) subjecting the sterols in the sterol-rich distillate to crystallization purification.

24 Claims, No Drawings

PROCESS FOR ISOLATION OF FATTY ACIDS, RESIN ACIDS AND STEROLS FROM TALL OIL PITCH

CROSS-REFERENCE TO RELATED APPLICATION

This application is a National Stage entry of International Application No. PCT/FI2008/000027, filed Feb. 15, 2008, which claims priority to Finland patent Application No. 20070137, filed Feb. 15, 2007, the entire specification and claims of which are incorporated herewith by reference.

The invention relates to a process for isolation of fatty acids, resin acids and sterols from tall oil pitch. Tall oil pitch is the composition formed as a residue when distilling crude tall oil to tall oil. Important industrial chemicals, such as fatty and resin acids are produced from crude tall oil by distillation. The residue, tall oil pitch, is composed partly of the same kind of acids, which appear mainly as esterified with sterols and triterpene alcohols, but also to some extent of free sterols and different kinds of terpene compounds and in addition the pitch contains some amounts of other organic wood extractive matter. Sterols, as well as fatty and resin acids, are valuable raw materials for the Industry. The composition of the pitch varies depending amongst other things on the source of the wood material used as raw-material in the wood pulping process. The pulping process, e.g. Kraft pulping, produces pulp, and as a by-product tall oil.

Sterols are used in the food and pharmaceutical industry for lowering serum total and LDL cholesterol levels, as raw-material for producing hormonal steroids and as emulsifiers especially in the cosmetic industry. Sterols are produced from vegetable oil deodorising distillates and from wood based materials including pulping soap and tall oil pitch.

There is not any known suitable process in which both sterols and fatty and resin acids could easily and economically be separated from tall oil pitch.

U.S. Pat. No. 3,691,211 discloses a process for preparing sterols from plant sources, especially tall oil pitch, by extraction in a water-alcohol-hydrocarbon mixture followed by saponification to release the free sterols. Finally the sterols are purified and isolated by recrystallisation and filtration. This method clearly only aims at isolating sterols from the pitch.

WO 0064924, EP 952208, U.S. Pat. No. 6,462,210 and EP 1081156 all discloses evaporative fractionation procedures starting from neutrals. None of them therefore deals with the isolation of both sterols and fatty and rosin acids. Neutrals are obtained by solvent extraction of e.g. Kraft soaps or tall oil soap.

In U.S. Pat. No. 3,926,936 fatty and rosin acids as well as hard pitch of a new type are manufactured starting from tall oil pitch by a process wherein the tall oil pitch is initially heated, either as such or in a solvent, at a temperature of 200-300° C. together with an alkali reagent. The product thus obtained is acidified into oil having an acid value of 50-150. The oil obtained is distilled, either as such or after the removal of the salt produced in the acidification, at a pressure lower than 50 mm Hg whereby there is obtained firstly a distillate with an acid value of 100-190 and which may be refined further e.g. by a known fractionating distillation process at lowered pressure, and secondly a distillation residue with a softening point exceeding 50° C. (the new hard pitch). In this process the sterols are destroyed and only acids can be utilised from the tall oil pitch.

U.S. Pat. No. 3,887,537 discloses a process for recovering fatty acids and rosin acids which comprises the steps of saponifying a tall oil head or pitch, introducing the saponified material into a thin film evaporator equipped with a rake and having a clearance of not more than one millimeter between the blade tips and the surrounding tube wall, evaporating and removing the low-boiling matter including unsaponifiables by a treatment at a temperature not lower than the melting point of the resulting soaps, and thereafter decomposing the saponification products to obtain the free fatty and rosin acids. The distillate from the second evaporation step contains 17.5% unsaponifiables. This process is difficult to perform because the salts in the saponified material make the viscosity of the mixture rise in the evaporator.

CZ 256092 discloses a method for isolating sterols from tall oil pitch. The pitch is saponified and acidified and then several fractionating distillations in short path evaporators are performed in order to isolate a fraction rich in sterols. Finally the sterols are crystallised from ethanol. There is no disclosure of the content of the other fractions, but it is clear that acids are distributed in several fractions and could be collected in low yields only.

WO 9942471 discloses a method of preparing sterols from tall oil pitch comprising the steps of converting the sterol esters to free sterols by saponification, and neutralising to produce a modified pitch containing the free sterols. The water phase is allowed to separate and is then discharged. Then light ends are removed from the modified pitch by evaporation to produce a bottom fraction containing the free sterols. Thereafter the bottom fraction is evaporated to produce a distillate containing the free sterols. This distillate is dissolved in a solvent comprising an alcohol to produce a solution containing the free sterols, the solution is cooled to produce a slurry of crystallised free sterols and the crystals are finally washed and filtered. This method aims at isolating sterols only. In the neutralised modified pitch the acids are partly free and partly in the form of salts. This leads to a situation where the acids will appear in different fractions, which makes the process for collecting the acids very complicated and results in a very low yield. The separation of the water phase from the oily phase is also extremely slow. In addition, re-esterification of sterols partly occurs during the evaporations leading to a lower yield.

WO 9916785 discloses a method for separating a sterol or sterol ester from crude tall oil comprising fractionating the crude tall oil into a residue fraction, the pitch, and a volatile fraction, wherein the temperature of the residue fraction does not exceed about 290° C., and wherein the residue fraction includes the sterol or sterol ester. A second method is also provided for separating unsaponifiable material from a tall oil stream, e.g. from tall oil pitch comprising saponifying the stream with a mixture of sodium hydroxide and potassium hydroxide to form sodium and potassium salts of fatty acids and rosin acids. In the second evaporation step the unsaponifiable material is evaporated. The unevaporated sodium and potassium salts can be acidulated to release free acids. Practically, evaporations of mixtures containing large amounts of salts are very problematic because of the high viscosity formed.

WO 03064442 discloses a process for isolating and purifying phytosterols and phytostanols from tall oil pitch which comprises the following steps: a) feeding the pitch into a first distillation column, b) distilling the pitch to remove excess rosin acids and fatty acids to form a distilled pitch, c) saponifying the distilled pitch with an aqueous solution of one or more alkali metal bases to form a saponified pitch, d) neutralising the saponified pitch with an amount of acid sufficient to achieve an ending pH of between 5.8 and 6.3 thereby forming a neutralised pitch, e) allowing the neutralised pitch to phase separation for a period of at least 12 hours, thereby forming a settled pitch and a water phase, f) removing substantially all of the remaining water from the settled pitch to form a modified pitch, g) distilling the modified pitch in a second distillation column to remove lights ends from the modified pitch and to produce a bottom fraction comprising free phytosterols and/or phytostanols, h) distilling only the bottom fraction in a third distillation column to produce a light phase distillate comprising free phytosterols and/or phytostanols, i) dissolving only the light phase distillate in a solvent comprising at least one alcohol to produce a solution of phytosterols and/or phytostanols, j) cooling the solution to form a slurry with phytosterols and/or phytostanols crystallised. This process suffers from the same drawbacks as the process disclosed in WO 9942471.

US 2005/0033027 A1 discloses processes for separating unsaponifiable valuable products from raw materials, such as tall oil pitch. In one of the disclosed processes tall oil pitch is treated with a sodium hydroxide solution to hydrolyze the sterols. The obtained mixture of rosin/fatty acids in their Na-soap and/or Na salts form and free sterols is acidulated with a mineral acid to yield a mixture composed of fatty/rosin acids and free sterols. Then this mixture is fed into a short path evaporator to distillate out the fatty/rosin acids and free sterols. This distillate is then neutralized to form a metal soap which is subjected to a number of treatments, including treatments in a thin film evaporator and a short path evaporator and a crystallization. The disclosed processes are very complicated and require the formation of the metal soap.

The process according to the invention solves the problems occurring in the prior art. Both sterols and acids can be obtained in good yields.

It has now been found that in order to be able to obtain fatty and resin acids in high yields, besides sterols, the acids have to be obtainable in one phase i.e. here in the organic phase as free acids. This can be realised by acidulating the saponified pitch (pH<4 of the water phase). This also improves the phase separation. The acidulation is done using a mineral acid preferably sulphuric acid. This though leads to a problem because the free mineral acid functions as a re-esterification catalyst especially at high temperatures. Therefore sterols and other alcohols will react with fatty and resin acids especially during evaporation fractionation conditions to form esters and thereby reduce the yields of the components. Adding exactly the right amount of mineral acid would be one solution but this is practically impossible. Therefore an alkali (e.g. NaOH, KOH and/or NH₄OH) can be added in an amount to just remove the free mineral acid into its salt form, but not to neutralise the free fatty and resin acids. This inactivation step of the free mineral acid can be performed directly after the addition of the free mineral acid or preferably after phase separation, or alternatively, after or in connection with the optional water wash of the organic phase.

Another way of minimising the risk of re-esterification is to minimise the time in the evaporation fractionation. This can be realised by using a short path evaporator. It has also been found that by collecting both the fatty and resin acids and the sterols in the first distillate the possible contact time with the free mineral acid, which will remain in the residue, is minimised. Therefore, the process according to the invention can be a process including an acidulation step, an optional inactivation step of the free mineral acid, an evaporation fractionation performed in a short path evaporator wherein the evaporation of also the sterols is performed as the first evaporation fraction step.

Thus, in a first aspect of the present invention there is provided a process for recovering fatty acids, resin acids and sterols from tall oil pitch, said process comprising
    a) saponifying the tall oil pitch with an alkali to hydrolyse esters included in the pitch to free alcohols and organic acids in salt form,
    b) acidulating the saponified pitch with a mineral acid to convert the organic acids in salt form into free organic acids and to form an organic phase and an aqueous phase,
    c) separating the aqueous phase from the organic phase,
    d) evaporation fractionating the organic phase to obtain a distillate rich in sterols, fatty acids and resin acids,
    e) evaporation fractionating the distillate to obtain a bottom fraction rich in sterols, and a distillate rich in fatty acids and resin acids, and
    f) subjecting the sterols in the sterol-rich bottom fraction to crystallisation purification.

The alkali used in step a) can be an aqueous solution of an alkali metal hydroxide, such as sodium hydroxide or potassium hydroxide or a mixture thereof.

In a preferred embodiment of the invention there is no co-solvent present in the saponification.

The mineral acid used in step b) can be sulphuric acid or hydrochloric acid, preferably sulphuric acid.

In a preferred embodiment of the invention the amount of the mineral acid in the acidulation is such that the pH of the aqueous phase is less than 4, preferably less than 3.8, more preferably less than 3.5. A preferred range is between 1.5 and 3.8, more preferably between 2.0 and 3.8, and most preferably between 3.0 and 3.5.

The sterols in the sterol-rich bottom fraction are preferably subjected to purification by solvent crystallisation as will be explained in more detail below. Also other crystallisation procedures can be used, such as melt crystallisation.

The distillate rich in fatty acids and resin acids can be subjected to distillation to obtain separately fatty acids and resin acids. Preferably this distillate is returned to the fractionation system of tall oil refinery.

The organic phase can be treated with an alkali to destroy excess mineral acid used for acidulating the saponified pitch. This treatment inhibits the re-esterification of alcohols and fatty and resin acids. The alkali can be ammonium or an alkali metal hydroxide, such as sodium hydroxide or potassium hydroxide or a mixture thereof.

Alternatively, the organic phase can treated with an alkali in an amount in excess to that needed for destroying excess mineral acid used for acidulating the saponified pitch, resulting in a partial saponification of fatty acids and resin acids, the saponified fatty acids and resin acids being obtained in the bottom fraction of the evaporation fractionation in step d). The alkali can be ammonium or an alkali metal hydroxide, such as sodium hydroxide or potassium hydroxide or a mixture thereof. If the fatty acids and resin acids are to be recovered, this bottom fraction can be subjected to acidulation, aqueous phase separation and evaporation fractionation to obtain a fraction rich in fatty acids and resin acids. The acidulation can be carried out as explained above and the evaporation fractionation can be carried out as explained below for example in a thin film evaporator.

Preferably though the amount of alkali is adjusted to only neutralise the excess of mineral acid, whereby the yield of fatty and resin acids is maximised in the distillate and the isolation process of the acids is more simple.

The organic phase prior to step d) can subjected to a pretreatment step for removing water from the organic phase, preferably carried out in a vacuum degasser.

Preferably the evaporation fractionation of step d) is carried out in a short path evaporator. The short path evaporator can operate at a temperature in the range of 240° C. to 300° C., preferably 260° C. to 280° C. and at a pressure of at most 50 Pa mbar, preferably at most 20 Pa mbar, and more preferably at most 10 Pa.

Preferably the evaporation fractionation of step e) is carried out in a thin film evaporator or in a steam distillation column. The thin film evaporator or the steam distillation column can operate at a temperature in the range of 170° C. to 290° C., preferably 230° C. to 270° C. and at a pressure in the range of 10 to 500 Pa, preferably 20 to 500 Pa.

Preferably the sterols in the sterol-rich bottom fraction obtained from step e) are subjected without further treatment to crystallisation purification in step f).

In a second aspect of the present invention there is provided a process for recovering fatty acids, resin acids and sterols from tall oil pitch, said process comprising a1) saponifying the tall oil pitch with an alkali to hydrolyse esters included in the pitch to free alcohols and organic acids in salt form, b1) acidulating the saponified pitch with a mineral acid to convert the organic acids in salt form into free organic acids and to form an organic phase and an aqueous phase, c1) separating the aqueous phase from the organic phase, d1) treating the organic phase with an alkali to destroy excess mineral acid used for acidulating the saponified pitch, e1) evaporation fractionating the alkali-treated organic phase to obtain a distillate rich in fatty acids and resin acids and a bottom fraction rich in sterols, f1) evaporation fractionating the bottom fraction to obtain a distillate rich in sterols, and g1) subjecting the sterols in the sterol-rich distillate to crystallisation purification.

The alkali used in step a1) can be an aqueous solution of an alkali metal hydroxide, such as sodium hydroxide or potassium hydroxide or a mixture thereof.

In a preferred embodiment of the invention there is no co-solvent present in the saponification.

The mineral acid used in step b1) can be sulphuric acid or hydrochloric acid, preferably sulphuric acid.

In a preferred embodiment of the invention the amount of the mineral acid in the acidulation is such that the pH of the aqueous phase is less than 4, preferably less than 3.8, more preferably less than 3.5. A preferred range is between 1.5 and 3.8, more preferably between 2.0 and 3.8, and most preferably between 3.0 and 3.5.

The sterols in the sterol-rich distillate are preferably subjected to purification by solvent crystallisation as will be explained in more detail below. Also other crystallisation procedures can be used, such as melt crystallisation.

The distillate rich in fatty acids and resin acids can be subjected to distillation to obtain separately fatty acids and resin acids. Preferably this distillate is returned to the fractionation system of tall oil refinery.

The alkali used in stewp d1) to destroy excess mineral acid can be ammonium or an alkali metal hydroxide, such as sodium hydroxide or potassium hydroxide or a mixture thereof.

The alkali-treated organic phase prior to step e1) can be subjected to a pretreatment step for removing water from the organic phase, preferably carried out in a vacuum degasser.

Preferably the evaporation fractionation of step e1) is carried out in a thin film evaporator or in a steam distillation column. The thin film evaporator or the steam distillation column can operate at a temperature in the range of 170° C. to 290° C., preferably 230° C. to 270° C. and at a pressure in the range of 10 to 500 Pa, preferably 20 to 500 Pa.

Preferably the evaporation fractionation of step f1) is carried out in a short path evaporator. The short path evaporator can operate at a temperature in the range of 240° C. to 300° C., preferably 260° C. to 280° C. and at a pressure of at most 50 Pa, preferably at most 20 Pa and more preferably at most 10 Pa.

Preferably the sterols in the sterol-rich distillate obtained from step f1) are subjected without further treatment to crystallisation purification in step g1).

In the following the above first and second aspects of the invention will be described in more detail.

Process Option 1

The process according to the first aspect of the invention (process option 1) includes the following steps.

In this option pitch is first saponified and all the soaps are acidulated back to free acids. From the acidulated pitch soap all the vaporisable compounds are evaporated first by using a short path evaporator and the distillate is then fractionated to make a sterol-rich fraction and an acid rich fraction suitable for further processing. The risk of re-esterification of acids and alcohol components is minimised by using shortest possible residence time in the first distillation stage (where traces of esterification catalysts may be present) and also by distilling over the sterols from the first residue where the catalysts will remain. In addition, re-esterification can be further minimised by destroying the traces of esterification catalyst, i.e. free mineral acid, in the evaporation feed prior to evaporation.

A) Saponification of Pitch

In the saponification reaction the esters included in the pitch are hydrolysed to yield free alcohols and free acids, which acids are in salt form. Saponification is performed by reacting with alkali metal hydroxide (NaOH, KOH or their mixture) in water (devoid of organic co-solvent) at a temperature between 130° C. and 220° C., preferably between 140° C. and 215° C., more preferably between 150° C. and 210° C., still more preferably between 160° C. and 205° C., even more preferably between 170° C. and 200° C. and most preferably between 170° C. and 195° C. To avoid sterol decomposition if the temperature is 200° C. or more a short reaction time for the saponification step, preferably at most 30 minutes, more preferably at most 20 minutes, is advantageous. To facilitate the saponification reaction it is possible to use an organic solvent, especially an alcohol, as co-solvent, but this is usually uneconomical due to the need for recovery of the solvent before subsequent process steps. Preferred solvents include ethanol, propanol and ketones, such as methyl erthyl ketone, and mixtures thereof. Adding an organic solvent therefore makes the process more complicated and more expensive, which is also due to solvent losses. When an organic co-solvent is used the suitable temperature range for the saponification is e.g. between 80-100° C., or at the boiling point of an unpressurised system.

B) Acidulation of Saponified Pitch

A sufficient amount of a mineral acid, preferably a sulphuric acid solution is mixed to the saponified pitch at a temperature of preferably at least 80° C. The formed organic and water phases are separated by gravitation or centrifugation and the water phase containing sodium sulphate is discharged. The amount of added sulphuric acid must be such that the pH of the water phase is at most 4.0, preferably between 1.5 and 4.0, more preferably from 1.5 to less than 4.0, and most preferably between 3.0 and 3.5. This means that practically all the organic acids are in free acid form. The phase separation is fast.

Optionally the organic phase can still be washed with water after having discharged the salt solution in order to remove mineral acid residues from the reaction mixture. However, this stage is usually somewhat more difficult than the separation of the salt solution because the water phase containing only a small amount of salts has a greater tendency to form an emulsion. The reason for this is that sterols act as emulsifiers, whereas salts help breaking the emulsion. Also the density differences of the phases are much smaller when there are less salt in the water phase, which also makes the phase separation more difficult and therefore strengthens the emulsion.

Alternatively, or in addition to the water wash, the organic phase can optionally be treated with ammonium or alkali metal hydroxide to destroy the excess of free mineral acid. In order to get maximum yields in acid recovery it is necessary to avoid adding extra amounts of base, so that only the free mineral acid is neutralised into its salt form and thereby inhibiting its catalysing effect on the re-esterification of alcohols and fatty and resin acids. The right amount of hydroxide to be added can be calculated for example based on the titration of the acidulated saponified pitch.

C) Fractionation of Acidulated Saponified Pitch by Short Path Evaporation and Thin Film Evaporation to Form an Acid-Rich Fraction and a Sterol-Rich Fraction C1) Short Path Evaporation of Acids and Sterols Next step n the process is the evaporation of all the vaporisable matter from the acidulated saponified pitch in a short path evaporator. By evaporating both the acids and the sterols in the first evaporating step the sterols are removed from the acidulated saponified pitch containing traces of mineral acid (functioning as re-esterification catalyst) and the re-esterification can thereby be avoided or at least minimised. In addition a short path evaporator should be used in this evaporation because, in a short path evaporator the residence time of the material at high temperature is very short, hence the danger of re-esterification of acids and alcohols—when traces of catalysing amounts of mineral acid still may be present—is minimised. The temperature in this evaporation is between 240-300° C., preferably between 260-280° C., and the vacuum is at most 50 Pa, preferably at most 20 Pa and more preferably at most 10 Pa.

C2) Fractionation of Distillate from C1 to Produce a Fraction Containing Acids and a Sterol-Rich Fraction After the short path evaporation the next step of the process is to separate fatty and resin acids from the short path distillate. This takes place by fractional distillation using either a thin film evaporator equipped with a construction improving the fractionation efficiency (e.g. a rectification column or a partial condenser) or with steam distillation fractionation in a steam distillation column. The distillate (fraction Z) contains the acids and the residue is the sterol-rich fraction (fraction Y). The temperature in this evaporation is between 170-290° C., preferably between 230-270° C., and the vacuum formed is between 10-50 Pa. If a system is used including a rectification column the pressure in the column head will be about 20-500 Pa. In this fractionation step a short path evaporator should not be used because a fractionation column or partial condenser can not be used in connection with it. The fractionating effect of a short path evaporator is insufficient for this fractionation step.

The yield of acids in fraction Z and thus an increased concentration of sterols in fraction Y is possible by using more theoretical separation stages. This can be achieved e.g. by using a more efficient fractionating column.

It is also possible to still distillate a minor fraction from Y and combine the two obtained distillates to form the acid-rich fraction, while the residue is the sterol-rich fraction. Even more preferred is to still distillate a minor fraction from Y and a major fraction from Z and combine both these distillates to form the acid-rich fraction and both these residues to form the sterol-rich fraction.

D) Further Processing of Material Fractions from C2

D1) It is Most Preferred to Integrate the Obtained Fraction Z into a Tall Oil Distillation Plant. The Recovered Acid Fraction Can Easily Be Returned to the Acid Distillation Columns for Further Purification Into Fatty and Resin Acid Fractions.

D2) Sterols from the Sterol-Rich Fraction Y are Subjected to Purification by Using Conventional Crystallisation Processes, such as Solvent Crystallisation.

The sterol purification takes preferably place by solvent crystallisation. It is advantageous to use a solvent mixture having a composition of methyl ethyl ketone 65-75% by weight, methanol 5-20% by weight and water 5-15% by weight, especially when the original raw material is obtained from crude tall oil containing hardwood (birch) extractives. This is due to sterol resembling components, which tend to interfere with sterol purification.

In case the origin is pure softwood, there is a much wider selection of possible crystallisation solvents, such as hydrocarbon/optionally alcohol/optionally water blends or ethanol. Optimal compositions for crystallisation of sterols are well known in prior art. A preferred crystallisation solvent includes hydrocarbon:lower alcohol:water in following weight ratio 1.5-5:0-0.5:0-1, preferably 1.5-3.5:0.03-0.35:0-1. The hydrocarbon solvent can be hexane, heptane, octane, cyclohexane, methylcyclohexane or a mixture thereof. A preferred alcohol is methanol.

The sterol obtained from the crystallisation can, if desired, be subjected to a second crystallisation. Preferably the mother liquid from the second crystallisation is utilized in the following first crystallisation in order to obtain good yields.

Process Option 2

The process according to the second aspect of the invention (process option 2) includes the following steps.

In this option pitch is first saponified and the liberated soaps are acidulated back to free acids. The traces of free mineral acids present in the acidulated pitch soap are then destroyed by using alkali metal or ammonium hydroxide in order to minimise the risk of re-esterification and therefore assuring the mineral acids are in inactive salt form.

After this a fraction containing fatty and resin acids is distilled from the mixture by using a thin film evaporator equipped with a construction improving the fractionation efficacy (e.g. a partial condenser or preferably a fractionation column), or by steam distillation fractionation in a steam distillation column. After this a sterol rich fraction is evaporated from the previous residue by using a short path evaporator.

The further processing and purification of acid and sterol fractions takes place in the corresponding way as disclosed in process option 1.

The following examples illustrate the present invention in more detail. In this specification the percentages refer to % by weight unless otherwise specified.

EXAMPLE 1A

Process Option 1

Pretreatment of Tall Oil Pitch and Subsequent Distillation of Fatty Acids and Sterols Saponification and acidulation: 100 kg tall oil pitch obtained from plant distilling CTO from a Scandinavian pulp mill (total sterol content 11.0%, whereof free sterols 3%) was heated and added to a pressure reactor. To the pitch 13.5 kg 50% NaOH was added, the temperature was raised to 165° C. for 1.5 hours (good mixing). After the reaction analysis showed the free sterol content to be 10.9%. The reaction mixture was cooled to 100° C. and 29 kg sulfuric acid (9 kg concentrated sulfuric acid added to 20 kg water) was mixed into it. After having stopped the mixing the organic phase separated easily from the water phase. The discharged water phase had a pH 3.5, showing the acidulation was successful.

Distillation: The obtained de-esterified pitch was then fractionated by a short path evaporator (SPE) and thin film evaporator (TFE) as follows:

Evaporator design: The evaporations were performed by using a combined short path and thin film construction. The feed material was first led through a vacuum degasser to remove residual water as a pretreatment step to the distillation. Then it was fed to a short path evaporator (UIC KD10), from which the distillate went directly to the thin film evaporator which was equipped with a partial condenser. The operational conditions were:

|  | Temperature | Pressure |
| --- | --- | --- |
| Feed degasser | 140° C. | 300 Pa |
| SPE | 270° C. | 10 Pa |
| SPE, Internal condenser | 90° C. |  |
| TFE | 240° C. | 40 Pa |
| Partial condenser | 230° C. |  |

The feed rate was 10 kg/h. From this evaporator design three fractions were obtained:
X Residue from the short path evaporation
Y Residue from the thin film/partial condenser system (sterol rich fraction)
Z Distillate from the thin film/partial condenser system (mainly acids)

Characterisation of the Fractions

|  | X | Y | Z |
| --- | --- | --- | --- |
| Fraction/feed (weight/weight in %) | 32.6 | 47.7 | 19.7 |
| Free sterol content (weight/weight in %) | 0.6 | 21.0 | 1.7 |

Thus 96.8% of the free sterols in the feed were recovered into the three fractions. This indicates that only minor amounts of losses due to back esterification of sterols or sterol degradation happened. Furthermore, by using this design 95% of the recovered sterols went into fraction Y, from which they can be isolated by using solvent crystallisation.

The acid value of fraction Z was 161 mg KOH/g. This shows that the fraction is an excellent raw material for fatty and resin acid recovery especially by returning it back to the plant tall oil refinery's fractionation system.

A still improved yield of both acids and sterols could be obtained by using a more efficient fractionation column instead of the partial condenser.

If tall oil pitch from a pulp mill using only pine wood as raw-material had been used in this Example the content of sterols in the sterol rich fraction Y would have been significantly higher, probably 50-60% by weight, because the sterol concentration in the unsaponifiable part of the extractives in such a material is significantly higher than in a mixed birch/pine raw-material used in this example.

EXAMPLE 1B

Process Option 1

Saponification and acidulation was accomplished in a similar way as in the previous example. After acidulation 0.15 kg/100 kg pitch 50% NaOH was added into the organic phase to destroy the possible trace amounts of free mineral acids which may catalyse possible re-esterification reactions.

The distillation configuration and distillation conditions were similar as in example 1A.

The process produced the distillate and residue fractions characterized as follows:

Characterisation of the Fractions

|  | X | Y | Z |
| --- | --- | --- | --- |
| Fraction/feed (weight/weight in %) | 33.9 | 47.2 | 18.9 |
| Free sterol content (weight/weight in %) | 0.5 | 21.5 | 1.8 |

The acid value of fraction Z was 159 mg KOH/g.

The conclusion is that the overall results in both process versions 1A and 1B of process option 1 are almost identical. Due to a short residence time of the first evaporation it is not quite essential to make neutralisation of the possible excess amount of the esterification catalysing mineral acid. However, if for some reason (e.g. low distillation rate) residence time of the feed material at high temperature is prolonged, neutralisation obviously reduces the rate of re-esterification and thus reduces the danger of yield losses.

If neutralisation reagent (NaOH-solution) is used in excess amounts (i.e. more than amounts needed for neutralisation of the mineral acid), this leads to partial saponification of organic acids. In the process of these examples these saponified acids would remain in the fraction X, from which it would be possible to liberate and recover them by acidulation, water phase separation, and evaporation procedures. Acidulation and water phase separation are analogous to the procedure used in the process step after the NaOH saponification of this example. The evaporation of thus liberated acids is performed e.g. by using thin film evaporator at temperatures typically applied in fatty and resin acid evaporations.

EXAMPLE 2

Process Option 2

Saponification and acidulation was realised in a similar manner as in Example 1. After acidulation and water phase separation 0.15 kg/100 kg original pitch of 50% NaOH was added to the pitch phase to destroy trace amounts of free mineral acid otherwise catalysing re-esterification.

Distillation of Fatty Acids and Sterols:

The same evaporation equipment as in example 1 was here used in a different configuration.

In this trial the feed was the same as in Example 1 and it was degassed in the same way just before the evaporation fractionation. Then the lights fraction was evaporated with the thin film evaporator. The thin film unit was equipped with a partial condenser to make the separation more sharp. The residue of this first evaporation was then pumped into the short path evaporator, which separated it into a sterol rich fraction and a heavy residue.

The Evaporation Conditions:

|  | Temperature | Pressure |
| --- | --- | --- |
| Feed degasser | 140° C. | 300 Pa |
| TFE | 240° C. | 180 Pa |
| Partial condenser | 170° C. |  |
| SPE | 230° C. | 3 Pa |
| SPE, Internal condenser | 90° C. |  |

The feed rate was 10 kg/h
The Following Fractions Were Obtained:
X lights fraction (mainly acids)
Y sterol rich fraction
Z heavy residue
The Distribution of the Fractions:

|  | X | Y | Z |
| --- | --- | --- | --- |
| Fraction/feed (weight/weight in %) | 15.0 | 46.2 | 38.8 |
| Free sterol content (weight/weight in %) | 0.1 | 22.0 | 1.2 |

Thus 97.6% of the free sterols in the feed were recovered into the three fractions. This indicates that only minor amounts of losses due to re-esterification of sterols or sterol degradation happened. Furthermore, by using this design 94.9% of the recovered sterols went into fraction Y, from which they can be isolated by using solvent crystallisation.

The acid value of fraction X was 163 mg KOH/g. This shows that the fraction is an excellent raw material for fatty and resin acid recovery especially by returning it back to the plant tall oil refinery's fractionation system.

In this example as well, it is possible to increase the volume of acid fraction X and concentrate the sterols into fraction Y by using a more efficient rectification arrangement (a fractionating column instead of the partial condenser).

EXAMPLE 3

Comparative Example

Comparative example for process option 2—without eliminating traces of free mineral acids prior to evaporation.

This trial was performed in the same way as Example 2, but without the step of destroying the free mineral acids.
The Following Fractions Were Obtained:
X lights fraction (mainly acids)
Y sterol rich fraction
Z heavy residue
The Distribution of the Fractions:

|  | X | Y | Z |
| --- | --- | --- | --- |
| Fraction/feed (weight/weight in %) | 13.3 | 44.5 | 42.1 |
| Free sterol content (weight/weight in %) | 0.1 | 20.3 | 2.1 |

According to the analytical data 88% of the original sterols in the feed were recovered in the distillate fraction in the first distillation step, from which amount 95% were distilled into the sterol rich fraction in the second step. The acid value of fraction X was 160.

In Example 2 the overall yield of free sterols in the second distillate fraction (Y) was higher than in Example 3, where free mineral acids were not destroyed. This is due to the presence of traces of free mineral acid which function as esterification catalyst in Example 3. The results show the effect of minimising the re-esterification. In Example 1A the yield of sterols was good although the free mineral acid was not destroyed. This is due to the very short residence time in the short path evaporator, and in addition, that sterols already were distilled over in the first distillation step and the contact time with the re-esterification catalysts, remaining in the first residue, thereby shortened.

EXAMPLE 4

Crystallisation of Sterols 100 g of fraction Y from Example 1A was dissolved by refluxing in 100 g of a solvent mixture, which contained 70% by weight methyl ethyl ketone, 25% methanol and 5% water. After dissolution sterols were crystallised by slowly cooling the mixture to 20° C. The crystallised sterols were filtrated by a Buchner funnel and washed with a solvent mixture of the same composition. The purity of the crystals was 94% and yield 75% of the sterol content in fraction Y.

The invention claimed is:
1. A process for recovering fatty acids, resin acids and sterols from tall oil pitch, said process comprising
   a) saponifying the tall oil pitch with an alkali to hydrolyse esters included in the pitch to free alcohols and organic acids in salt form,
   b) acidulating the saponified pitch with a mineral acid to convert the organic acids in salt form into free organic acids and to form an organic phase and an aqueous phase,
   c) separating the aqueous phase from the organic phase,
   d) evaporation fractionating the organic phase to obtain a distillate rich in sterols, fatty acids and resin acids,
   e) evaporation fractionating the distillate to obtain a bottom fraction rich in sterols, and a distillate rich in fatty acids and resin acids, and
   f) subjecting the sterols in the sterol-rich bottom fraction to crystallisation purification,
   wherein the amount of the mineral acid in the acidulation is such that the pH of the aqueous phase is less than 4, and
   wherein the organic phase is treated with an alkali in an amount in excess to that needed for destroying excess mineral acid used for acidulating the saponified pitch, resulting in a partial saponification of fatty acids and resin acids, the saponified fatty acids and resin acids being obtained in the bottom fraction of the evaporation fractionation in step d).

2. The process of claim 1, wherein the amount of the mineral acid in the acidulation is such that the pH of the aqueous phase is between 1.5 and 3.8.

3. The process of claim 1, wherein the sterols in the sterol-rich bottom fraction are subjected to purification by solvent crystallisation.

4. The process of claim 1, wherein the distillate rich in fatty acids and resin acids is subjected to distillation to obtain separately fatty acids and resin acids.

5. The process of claim 1, wherein the bottom fraction of step d) is subjected to acidulation, aqueous phase separation and evaporation fractionation to obtain a fraction rich in fatty acids and resin acids.

6. The process of claim 1, wherein the organic phase prior to step d) is subjected to a pretreatment step for removing water from the organic phase.

7. The process of claim 1, wherein the evaporation fractionation of step d) is carried out in a short path evaporator.

8. The process of claim 7, wherein the short path evaporator operates at a temperature in the range of 240° C. to 300° C. and at a pressure of at most 50 Pa.

9. The process of claim 1, wherein the evaporation fractionation of step e) is carried out in a thin film evaporator.

10. The process of claim 9, wherein the thin film evaporator includes a rectification column.

11. The process of claim 9, wherein the thin film evaporator operates at a temperature in the range of 170° C. to 290° C. and at a pressure in the range of 10 to 500 Pa.

12. The process of claim 1, wherein the evaporation fractionation of step e) is carried out in a steam distillation column.

13. A process for recovering fatty acids, resin acids and sterols from tall oil pitch, said process comprising
   a1) saponifying the tall oil pitch with an alkali to hydrolyse esters included in the pitch to free alcohols and organic acids in salt form,
   b1) acidulating the saponified pitch with a mineral acid to convert the organic acids in salt form into free organic acids and to form an organic phase and an aqueous phase,
   c1) separating the aqueous phase from the organic phase,
   d1) treating the organic phase with an alkali in an amount in excess to that needed to destroy excess mineral acid used for acidulating the saponified pitch, resulting in a partial saponification of fatty acids and resin acids, the saponified fatty acids and resin acids being obtained in the bottom fraction of the evaporation fractionation in step e1,
   e1) evaporation fractionating the alkali-treated organic phase to obtain a distillate rich in fatty acids and resin acids and a bottom fraction rich in sterols,
   f1) evaporation fractionating the bottom fraction to obtain a distillate rich in sterols, and
   g1) subjecting the sterols in the sterol-rich distillate to crystallisation purification.

14. The process of claim 13, wherein the amount of the mineral acid in the acidulation is such that the pH of the aqueous phase is less than 4.

15. The process of claim 13, wherein the sterols in the sterol-rich distillate are subjected to purification by solvent crystallisation.

16. The process of claim 13, wherein the distillate rich in fatty acids and resin acids is subjected to distillation to obtain separately fatty acids and resin acids.

17. The process of claim 13, wherein the alkali-treated organic phase prior to step e1) is subjected to a pretreatment step for removing water from the organic phase.

18. The process of claim 13, wherein the evaporation fractionation of step e1) is carried out in a thin film evaporator.

19. The process of claim 18, wherein the thin film evaporator includes a rectification column.

20. The process of claim 18, wherein the thin film evaporator operates at a temperature in the range of 170° C. to 290° C. and at a pressure in the range of 10 to 500 Pa.

21. The process of claim 13, wherein the evaporation fractionation of step e1) is carried out in a steam distillation column.

22. The process of claim 13, wherein the evaporation fractionation of step f1) is carried out in a short path evaporator.

23. The process of claim 22, wherein the short path evaporator operates at a temperature in the range of 240° C. to 300° C. and at a pressure of at most 50 Pa.

24. The process of claim 13, wherein the amount of the mineral acid in the acidulation is such that the pH of the aqueous phase is between 1.5 and 3.8.

* * * * *